United States Patent [19]

Porter et al.

[11] 4,205,326
[45] May 27, 1980

[54] DATA COMMUNICATION APPARATUS

[75] Inventors: Cyril A. Porter, Kenton; Malcolm R. Wardle, Berkhamsted, both of England

[73] Assignee: GEC-General Signal Limited, Hertfordshire, England

[21] Appl. No.: 876,916

[22] Filed: Feb. 13, 1978

[30] Foreign Application Priority Data

Feb. 14, 1977 [GB] United Kingdom ................ 6089/77

[51] Int. Cl.$^2$ ........................... H04Q 9/00; H04J 3/00
[52] U.S. Cl. .................................. 340/147 R; 340/23; 370/86
[58] Field of Search ................. 340/147 R, 147 C, 23; 179/15 AL

[56] References Cited
U.S. PATENT DOCUMENTS

| 3,790,717 | 2/1974 | Abramson et al. | 179/15 AL |
| 3,879,710 | 4/1975 | Maxemchuk et al. | 179/15 AL |
| 4,081,612 | 3/1978 | Hafner | 340/147 R |

FOREIGN PATENT DOCUMENTS 1490260 10/1977 United Kingdom.
1493899 11/1977 United Kingdom.
1497197 5/1978 United Kingdom.

Primary Examiner—Donald J. Yusko
Attorney, Agent, or Firm—Kirschstein, Kirschstein, Ottinger & Cobrin

[57] ABSTRACT

A data communication apparatus adapted for use as a train describer system has a multiplicity of modules serially connected in a closed loop, each such module being arranged to transmit data to, and receive data from the two adjacent modules in the loop, a plurality of the modules located at spaced positions around the loop also being "interconnection" modules adapted to transmit data directly to and receive data directly from the adjacent interconnecting module or modules of the plurality.

7 Claims, 3 Drawing Figures

DATA COMMUNICATION APPARATUS

This invention relates to data communication apparatus and has an important application to data communication apparatus which can be adapted for use as a train describer system.

According to the present invention a data communication apparatus comprises a multiplicity of modules serially connected in a closed loop, each such module being arranged to transmit data to, and receive data from the two adjacent modules in the loop, a plurality of the modules located at spaced positions around the loop also being "interconnection" modules adapted to transmit data directly to and receive data directly from the adjacent interconnection module or modules of the plurality.

In a preferred form of the data communication apparatus there are at least three interconnection modules connected in a further closed loop. The modules forming the first closed loop may be arranged in a plurality of sectors comprising a plurality of modules, each sector being connected to an adjacent sector by an interconnection module.

When the data communication apparatus is adapted for use as a train describer system the individual modules, other than the interconnection modules, would be functional modules used to perform specific functions in the train describer system, for example to receive input data indicative of a signal aspect, to receive input data indicative of the position of a train on the railway track, to receive input data indicative of the type (description) of train present on a prescribed section of railway track, to operate a display showing a signal aspect and to operate a display showing the position of a train on the track, to operate a display showing the type (description) of train present on a prescribed section of railway track. Other functional modules may be used to enable an operator to control or modify a display or selected route, or to pass information to, or receive information from another train describer system.

The data passed around the first closed loop may be formed into messages having a standard format which is recognised by, and can be acted upon by, all the modules in the first closed loop. The use of a standard message format and interface enables all the modules to be formed by a standard microcomputer unit.

The invention will now be described, by way of example, with reference to the accompanying drawings in which.

Figure 1:
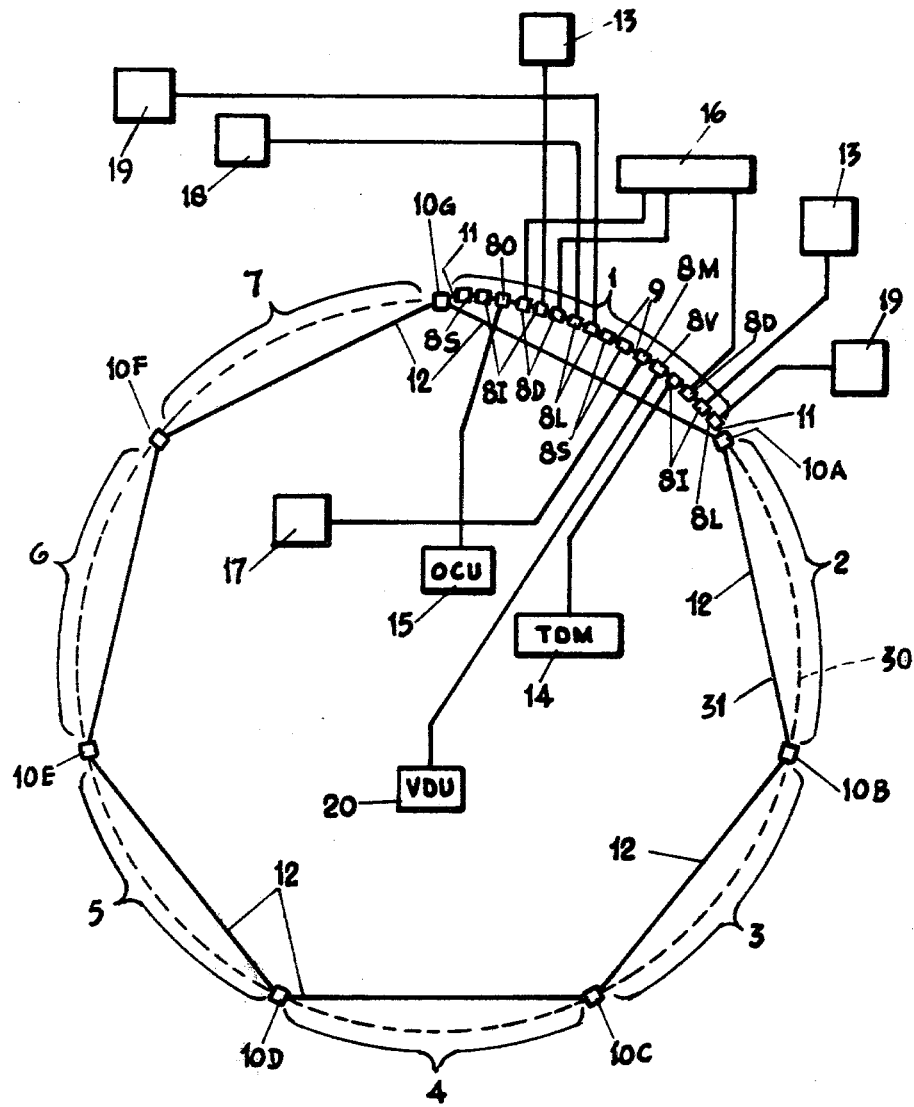
FIG. 1 is a block schematic diagram of a data communication apparatus in accordance with the invention adapted for use as a train describer system.

Referring in the first instance to FIG. 1, the data communication apparatus, which is adapted for use as a train describer system has seven sectors designated 1 to 7, each sector as shown in sector 1, comprising, typically, sixteen modules 8 connected in a serial arrangement by interconnections 9. The sectors 1 to 7 are serially connected to form a first closed loop 30 by interconnection modules 10 and interconnections 11. Each module 8 and each interconnection module 10 is arranged to transmit data to, and to receive data from, the two adjacent modules 8 or 10 in the loop 30 by way of the relevant interconnections 9 and 11. The interconnection modules 10 are also connected directly to each other in a further closed loop 31 by express highways 12, and are arranged to transmit data directly to, and receive data directly from the two adjacent interconnection modules 10 by way of the relevant express highways 12.

Each of the modules 8 is arranged to perform a single function of the train describer system, typical examples of which are as follows. A data input module 8I is arranged to receive data inputs from the railway signal system and on detecting certain data combinations to send a message to a stepping module 8S. The data inputs may be received directly from a local signal 13, or may be received from a remote signal by way of a data transmission link 14.

A stepping module 8S is arranged to store data regarding the descriptions of the trains which are presently located at the various signals and to keep the stored data up to date from the messages which are transmitted around the loop 30. Messages containing the data may be originated by an operator at an operator's control unit 15 and be received by an operator's control module 8O.

A display module 8D is arranged to provide output signals to produce an alpha-numeric display on a mimic panel 16. Each alpha-numeric display typically consists of four characters forming the description of a train at a particular location. The information displayed on the mimic panel 16 is kept up to date by messages received from a stepping module 8S.

An operator's control module 8O is arranged to permit an operator to change the data stored by a stepping module 8S and hence change a train description displayed on the mimic panel 16. Messages instructing a stepping module 8S to change the stored data are originated from the operator's control unit 15. The operator sets up the message on the control unit 15 and visually checks the message before permitting the message to be sent to the stepping module 8S. The control unit 15 also provides a visual and/or audible alarm when a stepping module 8S receives a signal from a monitor and alarm module 8M.

A monitor and alarm module 8M is arranged to provide test messages which are transmitted round the system at regular intervals and if they are not received back within a predetermined time an alarm message is generated by the monitor and alarm module 8M. If another module 8 in the loop 30 is unable to pass on a test message to an adjacent module 8 then the test message is returned to the monitor and alarm module 8M by the way it came with an indication of why the message was unable to be passed on. A control teleprinter 17 is connected to the monitor and alarm module 8M to enable the operation of the system to be monitored and controlled.

A serial data link module 8L is arranged to communicate with another train describer system 18 or with a small signal box 19 on the periphery of the controlled area or with other supervisory or control apparatus (not shown). The serial data link modules 8L transmit and receive data using synchronous or asynchronous techniques at speeds of up to 2400 baud. The data transmitted is gathered from messages circulating in the system while data received from a remote location is encoded as a message and circulated around the system for use by other modules 8.

A visual display unit module 8V is arranged to cause data contained in the messages circulating around the system to be displayed on a visual diplay unit 20 associated with the operator's control unit 15. The data displayed may be modified by an operator from a keyboard associated with the visual display unit 20 or from a keyboard associated with the operator's control unit 15.

Figure 3:
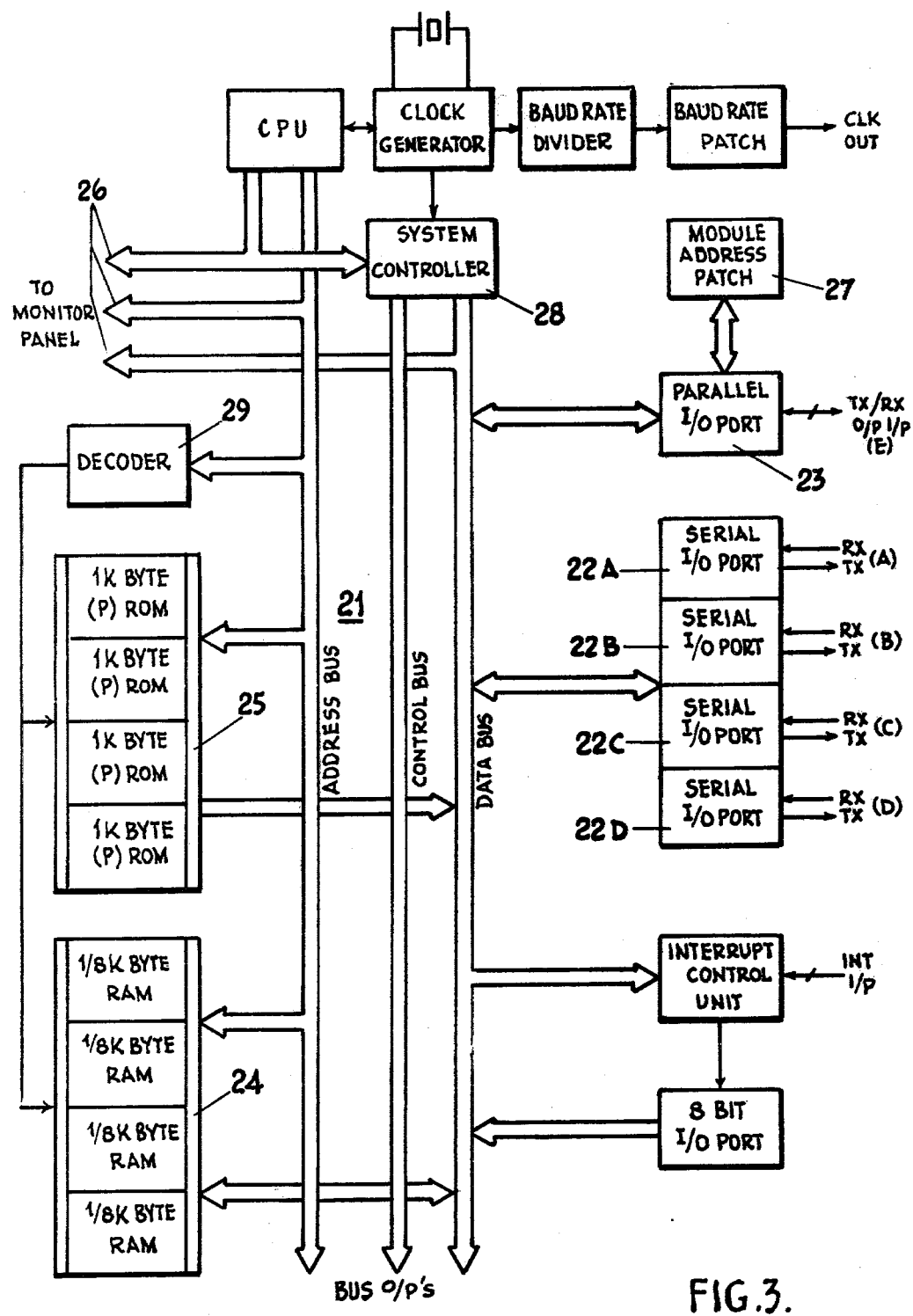
FIG. 3 is a block schematic diagram of a standard microcomputer unit used to form all of the modules shown in FIG. 1.

The basic component of every module 8 or 10 is a microcomputer unit 21 shown in detail in FIG. 3. The microcomputer unit 21 comprises four serial data links 22, sixteen bits of programmable parallel input/output 23, and ½K byte random access memory 24, a 4K read only memory 25, and output connections 26 for the provision of a monitor panel (not shown). In addition the microcomputer unit 21 is provided with an address patch 27 for identifying the module 8 or 10 concerned, a controller 28 and a decoder 29. The read only memory 25 contains a different functional program for each module 8 or 10, but contains the same message switching program for all the modules.

Figure 2:
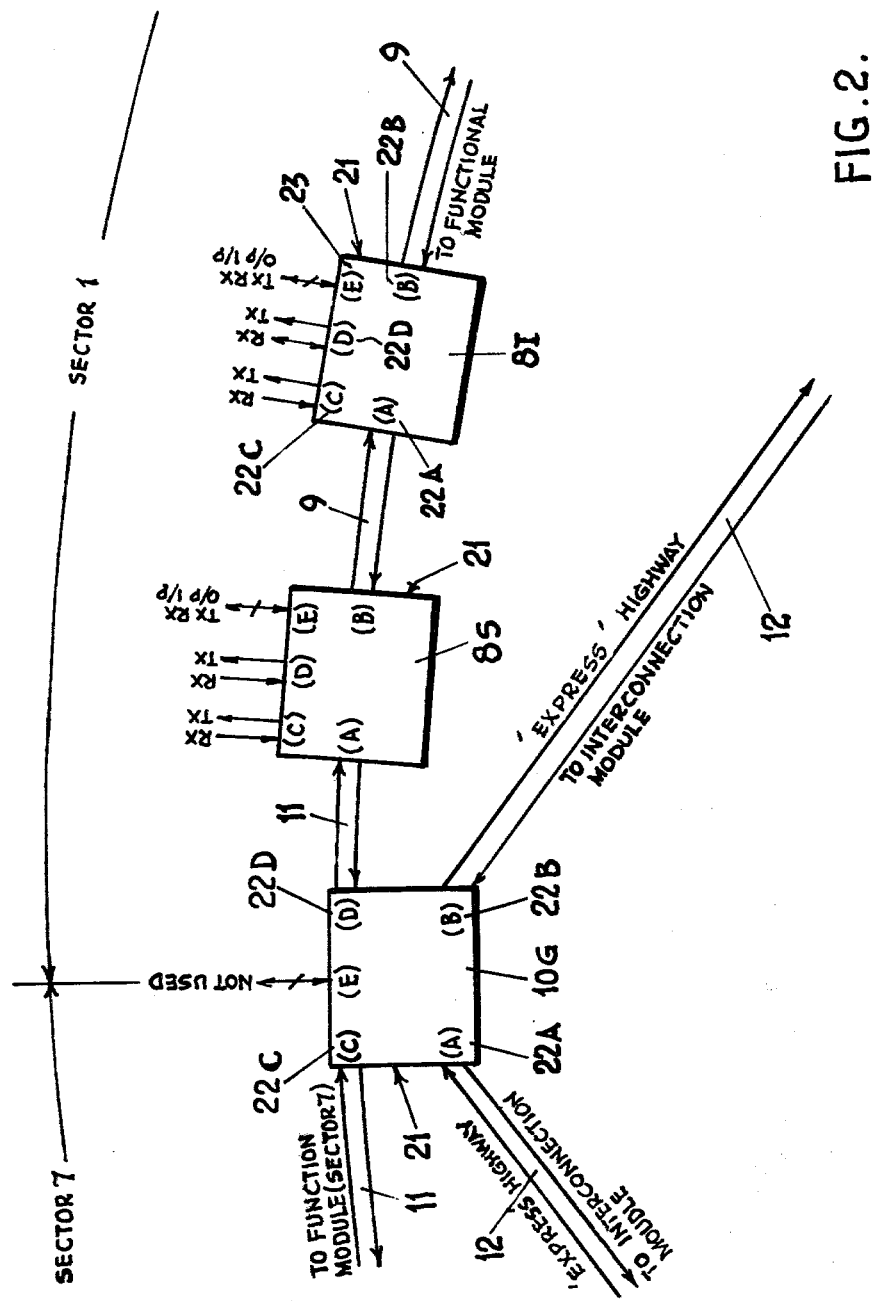
FIG. 2 is a block schematic diagram of part of the data communication apparatus of FIG. 1 showing in greater detail an interconnection module and several functional modules.

An interconnection module 10, which acts as a message switching arrangement uses all four of the serial data links 22A, 22B, 22C and 22D for communicating with adjacent functional modules 8 and adjacent interconnection modules 10. As shown in FIG. 2 the serial data links 22A and 22B provide for transmission and reception of messages along the express highways 12 to an adjacent interconnection module 10, while the serial data links 22C and 22D provide for transmission and reception of messages along the interconnections 11 to the adjacent functional modules 8. A functional module, such as input module 8I, uses the serial data links 22A and 22B for the transmission and reception of messages along the interconnections 9 to the adjacent functional modules 8, while the other two serial data links 22C and 22D and the parallel input/output provide for the transmission of data to, and the reception of data from the peripheral devices.

The train describer system so far described operates in the following manner. Each functional module 8 operates by receiving data from an adjacent module, operating on the received data in some way and, if appropriate, retransmitting the received data to the next adjacent module. The data input and output may be from and to devices outside the system or from another functional module 8. Messages are circulated round the loop, in both directions, by passing from one functional module 8 to the next. Excess delay between generation of a message and its reception at the furthermost point in the loop is avoided by provision of the express highways 12 whereby each message is also passed, in both directions, from one interconnection module 10 to the two adjacent interconnection modules 12.

A message generated by any functional module 8 has a fixed format comprising
STX—indicating the start of the message.
Address—indicating the originator.
Message number.
Message type—indicating the executor(s).
Information—(N words).
ETX—indicating end of message.
BCC—block check character.

Each word is one byte in length of which one bit is a parity bit. The first word, STX, indicates to a receiver the start of a new message. The address of the originator is included to allow the message to be removed from the system after completing a full circuit of the loop. Three bits of the word representing the address indicate the sector 1 to 7 in which the module 8 originating the message is located and the remaining four bits indicate the location of the module 8 within that sector. The message number enables a module 8 to reject a second message received with that number. Each type of message has a fixed number of information words although different types of message may have different numbers of words.

Consider a message originated by the penultimate module 8I in sector 1 counting in the clockwise direction. This message will be transmitted in both directions around the loop 30, although for the sake of clarity only the message taking a clockwise route around the loop 30 will be considered. The other message taking an anticlockwise route around the loop 30 would behave in a similar manner. The message would be transmitted to the adjacent module 8L with the sector address set to 0, since the originating module 8I has no knowledge of the sector in which it is located. When the message reaches the first interconnection module 10A, the sector address (sector 1) is filled in. The message is transmitted directly to the second interconnection module 10B via the express highway 12 and is also transmitted to the first functional module in sector 2. The message is passed from functional module to functional module in sector 2, until it reaches the last functional module in sector 2 which does not pass it on any further.

The message arriving at the second interconnection module 10B is transmitted directly to the third interconnection module 10C and is also transmitted from one functional module 8 to another in sector 3. As before, on arriving at the last functional module in sector 3 the message is not passed on any further from sector 3. This sequence is repeated until the message finally reaches interconnection module 10G. Since the message originated in sector 1 the message is not sent directly to interconnection module 10A, but is merely passed along the functional modules 8 in sector 1 with the sector address set at 0. When the message reaches the originating functional module 8I the message is not passed on any further as the loop 30 has been completely traversed.

As each message is received by a module 8 or 10 the horizontal and longitudinal parity are checked. If parity is correct an acknowledge (ACK) message is sent to the transmitting module. If parity fails a not acknowledged (NAK) message is sent to the transmitting module. When an NAK reply is received by a transmitting module the message is sent again. Up to three attempts may be made to transmit the message. If no reply at all is received, the repeat messages are sent after a predetermined time interval.

A train description is moved or stepped from one display position to another on a mimic panel 16 or on a visual display unit 20 when certain combinations of data inputs are present at an input module 8I. These data inputs may be divided into two types, condition inputs and trigger inputs. A "step" between the two display positions on a mimic panel or a visual display unit 20 takes place when the appropriate trigger input occurs, only if certain condition inputs are present.

All the data inputs are scanned regularly by the signal input modules 8I and the trigger inputs are checked for a change of state. When such a change of state occurs, a data input module 8I sends a message round the loop, in both directions, with this information. When this message is received by the appropriate stepping module 8S it first checks which step(s) could be triggered by this change and then generates a message requesting the state of the appropriate condition input(s) to these steps. The data input module(s) 8I respond by sending this information.

If the conditions are correct for a step to take place the stepping module 8S generates a message which states, for example, that a display on the mimic panel 16 driven from a display module 8D in sector 1 should now contain the train description in the message and another display on the mimic panel 16 driven from a similar display module 8D in sector 2 should clear its train description after a predetermined time delay. This time delay is to ensure that the display on the mimic panel 16 driven from the display module 8D in sector 1 contains the train description in the message before the display containing the train description which is driven from the display module 8D in sector 2 is cleared.

An operator's control module 8O drives its own verifying displays directly. The operator can thus set up a display address and train description on an operator control unit 15 or on a visual display unit 20 and check them before an appropriate message is put into the loop 30. When the operator is satisfied that the verifying display is correct he presses an appropriate control button (interpose, cancel or recall) which causes a message containing the displayed information to be transmitted into the system by the operator's control module 8O or the video display unit module 8V. When a stepping module 8S receives this message it generates a message to change the displays at the appropriate mimic panels 16 as for the stepping messages.

If a module 8 or 10 finds it is continually receiving a NAK reply, or no reply at all from an adjacent module it will generate an alarm message. When the alarm message is received by a monitor and alarm module 8M, this module 8M will compare alarm messages received from any other sources and will initiate an audible alarm and cause the teleprinter 17 to provide a print-out giving the location of the faulty module 8 or 10 or interconnection. This print-out enables a maintenance technician to quickly locate the fault. In addition a monitor and alarm module 8M enables the technician to generate test and interrogation messages to assist in fault finding. Certain modules, such as transmission modules, generate alarm messages which are required by a specific operator only. These messages are printed out by the teleprinter 17 associated with the monitor and alarm module 8M as well as being displayed at the appropriate operator's control unit 15.

In a large train describer system it is necessary to provide many modules of the same kind, for example many display modules 8D. So that these modules 8D may all contain the same program it is necessary for some information to be passed to them initially for such things as the display number for the display module 8D, to specify which are trigger inputs to the stepping module 8S and to specify the configuration of the visual display unit 20. The initiating messages would be generated either by manual reset or by power on to the stepping module 8S which generates the messages, or by a request from another module when that other module has power switched on.

Various modifications are possible depending on particular train describer system configurations and requirements. In small systems all signalling inputs could be checked by the data input modules 8I, for a change of state, and the appropriate messages generated. This would reduce the number of messages from a stepping module 8S when a trigger input occurred but would increase the total number of messages from a data input module 8I. Moreover, while the display modules 8D and the visual display unit modules 8V described above are arranged to produce alpha-numeric displays on a mimic panel 16, it will be appreciated that the display modules 8D and visual display unit modules 8V could be adapted to produce graphic or semi-graphic displays.

The data communication apparatus of the invention is advantageous in that it is flexible, thus making it possible to add modules or to remove modules from the loop 30 without adversely affecting the functioning of the rest of the apparatus. Moreover, transmitting the messages containing the data, in both directions around the loop 30, limits the effects of failures, and allows the system to continue operating if any single module fails. Finally, the provision of the inner express highways permits the messages to circulate around the loop 30 quickly and so reduces time delays.

Furthermore, the data communication apparatus of the invention permits the various components to be distributed physically as well as functionally, for example each functional module 8 may be located adjacent to the equipment it has to interface, with a consequent reduction in the length of interconnecting cables.

Although the data communication apparatus of the invention has been exemplified as being adapted for use in a train describer, it will be appreciated that it can equally be adapted for use in any control system which can be split into a multiplicity of separate functions.

We claim:

1. In a train describer system, data communication apparatus comprising
   (A) a multiplicity of modules serially connected in a first closed loop,
   (B) said modules being disposed in sectors,
   (C) each of said sectors comprising a group of functional modules,
   (D) said sectors being interconnected by interconnection modules,
   (E) said interconnection modules being directly interconnected in a second closed loop in parallel with said first closed loop,
   (F) each functional module imposing an originating address on any data message initiated by that functional module and being responsive to said originating address on reception of said data message to inhibit further transmission of the data message,
   (G) the last functional module in each sector being responsive to a sector address in said data message to re-transmit said data message to the next interconnection module only in the event said data message originated within the same sector, and
   (H) each interconnection module being responsive to said sector address to re-transmit a received data message to the next functional module and, in dependence upon said sector address, to the next interconnection module,
   (I) a data message originating at a particular functional module being thereby transmitted to every sector by way of said second closed cloop.

2. Data communication apparatus in accordance with claim 1, wherein said modules are responsive to data messages having a standard format comprising a number of information data words, said number depending upon the type of message and the data words being of fixed length.

3. Data communication apparatus according to claim 1, wherein said modules are bi-directional and receive and transmit data messages in both directions independently.

4. In a train describer system, data communication apparatus according to claim 1, wherein said functional modules include stepping modules for storing data constituting the identity and location of trains, and for updating the stored data in accordance with data messages circulated around said loops.

5. In a train describer system, data communication apparatus according to claim 1, wherein said functional modules include input modules for receiving signalling information from railway signals and transmitting it around said loops.

6. In a train describer system, data communication apparatus according to claim 1, wherein said functional modules include display modules connected to mimic diagram displays, said display modules producing output signals in response to data messages transmitted around said loops for controlling said mimic diagram displays.

7. Data communication in accordance with claims 1, 2, 3, 4, 5 or 6, wherein said modules comprise microcomputers.

* * * * *